(12) United States Patent
Tsujita et al.

(10) Patent No.: US 11,349,154 B2
(45) Date of Patent: *May 31, 2022

(54) SECONDARY BATTERY USING ALKALINE EARTH METAL ION MOVING DURING CHARGE AND DISCHARGE

(71) Applicant: Panasonic Intellectual Property Management Co., Ltd., Osaka (JP)

(72) Inventors: Takuji Tsujita, Osaka (JP); Yu Nishitani, Osaka (JP); Norihito Fujinoki, Osaka (JP); Morio Tomiyama, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 793 days.

This patent is subject to a terminal disclaimer.

(21) Appl. No.: 15/808,835

(22) Filed: Nov. 9, 2017

(65) Prior Publication Data
US 2018/0159177 A1 Jun. 7, 2018

(30) Foreign Application Priority Data

Dec. 7, 2016 (JP) .............................. JP2016-237242
Aug. 2, 2017 (JP) .............................. JP2017-149706

(51) Int. Cl.
*H01M 10/26* (2006.01)
*H01M 10/0562* (2010.01)
(Continued)

(52) U.S. Cl.
CPC ........... *H01M 10/26* (2013.01); *H01M 4/366* (2013.01); *H01M 4/381* (2013.01); *H01M 4/485* (2013.01);
(Continued)

(58) Field of Classification Search
CPC .. H01M 10/26; H01M 10/0562; H01M 4/381; H01M 10/0563; H01M 2300/0068
See application file for complete search history.

(56) References Cited

U.S. PATENT DOCUMENTS 3,808,042 A * 4/1974 Dietz ...................... H01L 23/15
427/96.1
10,511,053 B2 * 12/2019 Fujinoki ........... H01M 10/0562
(Continued)

FOREIGN PATENT DOCUMENTS

| CN | 101958426 A | 1/2011 |
| CN | 102083771 A | 6/2011 |

(Continued)

OTHER PUBLICATIONS

STIC search (Year: 2020).*
(Continued)

*Primary Examiner* — Brian R Ohara
*Assistant Examiner* — Brent C Thomas
(74) *Attorney, Agent, or Firm* — McDermott Will & Emery LLP

(57) ABSTRACT

A secondary battery includes: a first electrode; a second electrode; a first solid electrolyte covering the first electrode, the first solid electrolyte containing an alkaline earth metal; and a liquid electrolyte filling the space between the first electrode and the second electrode, the liquid electrolyte containing a non-aqueous solvent and a salt of the alkaline earth metal dissolved in the non-aqueous solvent.

16 Claims, 10 Drawing Sheets

(51) Int. Cl.
| | |
|---|---|
| *H01M 10/0563* | (2010.01) |
| *H01M 4/38* | (2006.01) |
| *H01M 10/0585* | (2010.01) |
| *H01M 4/62* | (2006.01) |
| *H01M 10/056* | (2010.01) |
| *H01M 4/485* | (2010.01) |
| *H01M 10/052* | (2010.01) |
| *H01M 4/36* | (2006.01) |

(52) U.S. Cl.
CPC .......... *H01M 4/62* (2013.01); *H01M 10/052* (2013.01); *H01M 10/056* (2013.01); *H01M 10/0562* (2013.01); *H01M 10/0563* (2013.01); *H01M 10/0585* (2013.01); *H01M 2300/0065* (2013.01); *H01M 2300/0068* (2013.01); *H01M 2300/0094* (2013.01)

(56) References Cited

U.S. PATENT DOCUMENTS

| | | | |
|---|---|---|---|
| 2002/0036131 A1* | 3/2002 | Kugai | H01M 4/0421 204/192.1 |
| 2002/0068677 A1 | 6/2002 | Crosbie | |
| 2004/0131933 A1 | 7/2004 | Itaya et al. | |
| 2006/0073390 A1 | 4/2006 | Omote et al. | |
| 2009/0197181 A1 | 8/2009 | Sakitani et al. | |
| 2011/0014518 A1 | 1/2011 | Nakai et al. | |
| 2011/0165400 A1 | 7/2011 | Quaghebeur et al. | |
| 2011/0171536 A1 | 7/2011 | Oki et al. | |
| 2014/0234700 A1 | 8/2014 | Moriwaka et al. | |
| 2015/0017536 A1 | 1/2015 | Abe et al. | |
| 2015/0364789 A1 | 12/2015 | Ogawa et al. | |
| 2016/0254541 A1* | 9/2016 | Kim | H01M 4/505 429/224 |
| 2016/0308248 A1 | 10/2016 | Burrell et al. | |
| 2017/0018804 A1 | 1/2017 | Ogasa et al. | |
| 2017/0229742 A1* | 8/2017 | Aykol | H01M 10/0525 |
| 2018/0159170 A1 | 6/2018 | Fujinoki et al. | |
| 2018/0190981 A1 | 7/2018 | Ban et al. | |
| 2019/0135644 A1* | 5/2019 | Ito | H01M 10/052 |

FOREIGN PATENT DOCUMENTS

| | | |
|---|---|---|
| JP | 2001-076533 | 3/2001 |
| JP | 2004-200015 | 7/2004 |
| JP | 2006-134871 | 5/2006 |
| JP | 2007-157416 | 6/2007 |
| JP | 2011-023241 A | 2/2011 |
| JP | 2012-099436 | 5/2012 |
| JP | 2017-022024 A | 1/2017 |
| WO | 2014/017461 | 1/2014 |
| WO | 2014/119663 A1 | 8/2014 |
| WO | 2014/175255 | 10/2014 |
| WO | 2016/042594 | 3/2016 |

OTHER PUBLICATIONS

Chen Ling et al., "First-principles study of the magnesiation of olivines: redox reaction mechanism, electrochemical and thermodynamic properties", J. Mater. Chem., May 16, 2012, 22, pp. 13517-13523.
Shibata et al., U.S. Appl. No. 15/371,063, filed Dec. 6, 2016.
Fujinoki et al., U.S. Appl. No. 15/658,320, filed Jul. 24, 2017.
Chen, X. et al.; "Comparing electrochemical performance of transition metal silicate cathodes and chevrel phase $Mo_6S_8$ in the analogous rechargeable Mg-ion battery system"; 2016, Journal of Power Sources 321; pp. 76-86.
Non-Final Office Action issued in U.S. Appl. No. 15/658,313, dated Oct. 3, 2019.
Non-Final Office Action issued in U.S. Appl. No. 15/658,313, dated Mar. 23, 2020.
Notice of Allowance issued in U.S. Appl. No. 15/658,320, dated Oct. 3, 2019.
Non-Final Office Action issued in U.S. Appl. No. 15/658,313, dated Sep. 15, 2020.
Non-Final Office Action issued in U.S. Appl. No. 15/658,313, dated Mar. 23, 2021.
Notice of Allowance issued in U.S. Appl. No. 15/658,313, dated Jun. 14, 2021.
English Translation of Chinese Search Report dated Dec. 16, 2021 for the related Chinese Patent Application No. 201710610334.4.
English Translation of Chinese Search Report dated Dec. 21, 2021 for the related Chinese Patent Application No. 201711001612.2.

* cited by examiner

SECONDARY BATTERY USING ALKALINE EARTH METAL ION MOVING DURING CHARGE AND DISCHARGE

BACKGROUND

1. Technical Field

The present disclosure relates to a secondary battery, in particular, an alkaline earth metal secondary battery.

2. Description of the Related Art

In recent years, practical application of alkaline earth metal secondary batteries has been expected. For example, magnesium secondary batteries have high theoretical capacity densities compared to existing lithium ion batteries.

International Publication No. WO 2014/017461 discloses a magnesium secondary battery including, as a positive electrode active material, a magnesium compound represented by a formula: $MgMSiO_4$ where M is at least one of Fe, Cr, Mn, Co, and Ni.

SUMMARY

In one general aspect, the techniques disclosed here feature a secondary battery including: a first electrode; a second electrode; a first solid electrolyte covering the first electrode, the first solid electrolyte containing an alkaline earth metal; and a liquid electrolyte filling the space between the first electrode and the second electrode, the liquid electrolyte containing a non-aqueous solvent and a salt of the alkaline earth metal dissolved in the non-aqueous solvent.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
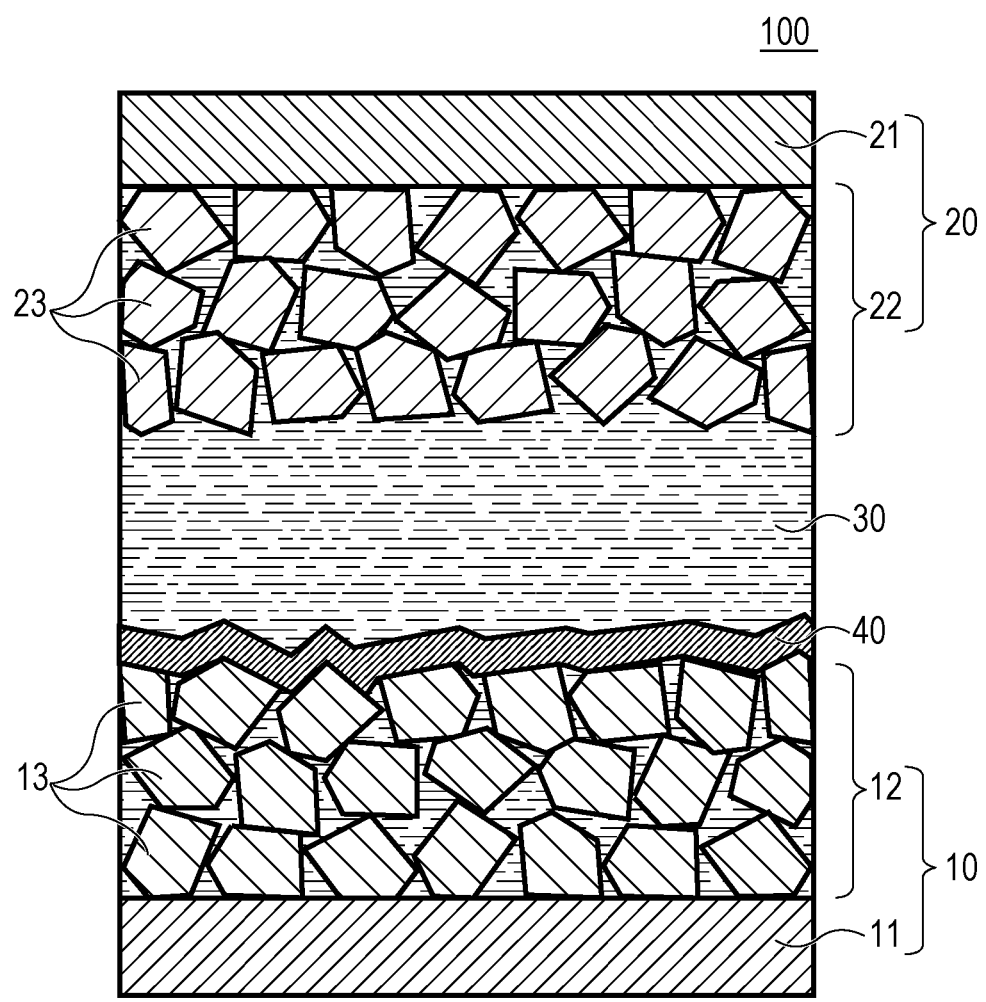
FIG. 1 is a schematic cross-sectional view illustrating a structural example of a secondary battery according to First Embodiment.

Underlying Knowledge Forming Basis of the Present Disclosure

As one technique for increasing the energy density of a magnesium secondary battery, a variety of positive electrode materials have been reported. For example, International Publication No. WO 2014/017461 discloses, as positive electrode materials, magnesium compounds represented by $MgMSiO_4$ (where, M is at least one selected from Fe, Cr, Mn, Co, and Ni).

Magnesium has a standard electrode potential of −2.36 V. This value is more positive than the standard electrode potential, −3.05 V, of lithium. Accordingly, magnesium secondary batteries are required to use a liquid electrolyte having higher resistance to oxidation than that of the liquid electrolyte of known lithium ion secondary batteries. For example, a charging potential of 4.00 V on the magnesium basis corresponds to a charging potential of 4.69 V on the lithium basis. This charging potential is so high to cause oxidative decomposition of the liquid electrolyte of known lithium ion secondary battery. Accordingly, if the charging potential of a positive electrode is higher than 4 V on the magnesium basis, a higher resistance to oxidation beyond a range that can be assumed for known lithium ion secondary batteries is required. However, merely few liquid electrolytes of magnesium secondary batteries satisfy such a requirement. In particular, when the potential of a positive electrode exceeds 4 V during the charging, no liquid electrolyte that satisfies such a requirement has been reported.

The present inventors focused on that transfer of electrons between an electrode and a liquid electrolyte decomposes the liquid electrolyte, and therefore investigated a method for suppressing the transfer of electrons. The inventors have so far succeeded in developing solid electrolyte thin films having ionic conductivity of magnesium ions, which have not been ever reported (for example, U.S. patent application Ser. Nos. 15/371,063, 15/658,313, and 15/658,320). This time, the present inventors have found that these solid electrolyte thin films have characteristics capable of blocking movement of electrons while allowing movement of magnesium ions, and thus have arrived at a secondary battery described below.

The description above does not limit the secondary battery according to the present disclosure to magnesium secondary batteries. Since the standard electrode potentials of other alkaline earth metals (e.g., Ca, Sr, and Ba) are also slightly more positive than the standard electrode potential of lithium, the present disclosure can be applied to alkaline earth metal secondary batteries. For example, magnesium in a variety of materials exemplified below can be appropriately replaced by another alkaline earth metal. In addition, since the standard electrode potential of aluminum is more positive than that of lithium, the present disclosure can also be applied to aluminum secondary batteries.

Drawings and Definition of Terms

The present disclosure will be described with reference to the drawings relating to specific embodiments, but the present disclosure is not limited thereto and is limited only by the claims. The drawings are merely schematic and non-limiting. In the drawings, the sizes and shapes of some components may be exaggerated or drawn with different scales for illustrative purposes. The dimensions and relative dimensions do not necessarily correspond to actual materialization of the present disclosure.

In the present disclosure, the terms "first" and "second" are used for distinguishing similar components, not for describing temporal or spatial order. Accordingly, the terms "first" and "second" are appropriately exchangeable.

In the present disclosure, the terms such as "upper" and "lower" are used for illustrative purposes and do not necessarily describe relative positions. These terms are exchangeable under appropriate circumstances, and various embodiments are operable in a direction other than those described or illustrated herein.

In the present disclosure, the term "X disposed on Y" means that X and Y are in contact with each other, and does not limit the relative positional relation between X and Y to a specific direction.

Among the components described in the present disclosure, the components that do not described in independent claims showing the highest-order concept are described optional components.

First Embodiment

[1. Structure of Secondary Battery]

FIG. 1 is a schematic cross-sectional view illustrating the structure of a secondary battery 100 according to First Embodiment.

The secondary battery 100 includes a positive electrode 10, a negative electrode 20, a liquid electrolyte 30, and a solid electrolyte layer 40. The negative electrode 20 faces the positive electrode 10 with a space therebetween. The solid electrolyte layer 40 covers the positive electrode 10. The liquid electrolyte 30 fills the space between the positive electrode 10 and the negative electrode 20. The secondary battery 100 can be charged and discharged by movement of alkaline earth metal ions between the positive electrode 10 and the negative electrode 20.

The secondary battery 100 may further include, for example, a separator (not shown) separating the solid electrolyte layer 40 and the negative electrode 20. In such a case, the liquid electrolyte 30 may be impregnated in the separator.

The shape of the secondary battery 100 is not limited to that shown in FIG. 1 and may be, for example, a sheet type, a coin type, a button type, a laminated type, a cylindrical type, a flat type, or a square type.

[2. Positive Electrode]

The positive electrode 10 includes a positive electrode collector 11 and a positive electrode active material layer 12. The positive electrode active material layer 12 is disposed on the positive electrode collector 11 and includes a plurality of positive electrode active material particles 13. In other words, the positive electrode active material particles 13 are disposed on the positive electrode collector 11. The upper surface of the positive electrode active material layer 12 is an irregular surface defined by the positive electrode active material particles 13.

The positive electrode collector 11 is, for example, a metal sheet or a metal film. The positive electrode collector 11 may be porous or non-porous. Examples of the metal material include aluminum, aluminum alloys, stainless steel, titanium, and titanium alloys. A carbon material, such as carbon, may be applied to the surface of the positive electrode collector 11. Alternatively, the positive electrode collector 11 a transparent electroconductive film. Examples of the transparent electroconductive film include films of indium tin oxide (ITO), indium zinc oxide (IZO), fluorine-doped tin oxide (FTO), antimony-doped tin oxide (ATO), indium oxide ($In_2O_3$), tin oxide ($SnO_2$), and Al-containing zinc oxide.

The positive electrode active material particles 13 contain, for example, at least one selected from a metal oxide containing an alkaline earth metal and a transition metal, a metal sulfide containing an alkaline earth metal and a transition metal, a polyanion salt compound containing an alkaline earth metal and a transition metal, and a fluorinated polyanion salt compound containing an alkaline earth metal and a transition metal. The alkaline earth metal is, for example, at least one selected from Mg, Ca, Sr, and Ba. The transition metal is, for example, at least one selected from Mn, Co, Cr, V, Ni, and Fe. These materials can occlude and release alkaline earth metal ions.

When the secondary battery 100 is a magnesium secondary battery, examples of the material of the positive electrode active material particles 13 include $MgM_2O_4$ (where, M is at least one selected from Mn, Co, Cr, Ni, and Fe), $MgMO_2$ (where, M is at least one selected from Mn, Co, Cr, Ni, and Al), $MgMSiO_4$ (where, M is at least one selected from Mn, Co, Ni, and Fe), and $Mg_xM_yAO_zF_w$ (where, M is a transition metal, Sn, Sb, or In; A is P, Si, or S; $0<x\leq2$; $0.5\leq y\leq1.5$; z is 3 or 4; and $0.5\leq w\leq1.5$).

When the secondary battery 100 is a calcium secondary battery, examples of the material of the positive electrode active material particles 13 include $CaM_2O_4$ and $CaMO_2$ (where, M is at least one selected from Mn, Co, Ni, and Al), The positive electrode active material particles 13 are not limited to the above-mentioned materials and, for example, need not contain alkaline earth metals. For example, the positive electrode active material particles 13 may be a graphite fluoride, a metal oxide, or a metal halide. The metal oxide and the metal halide may contain, for example, at least one selected from scandium, titanium, vanadium, chromium, manganese, iron, cobalt, nickel, copper, and zinc. For example, the positive electrode active material particles 13 may be a sulfide such as $Mo_6S_8$ or may be a chalcogenide compound such as $Mo_9Se_{11}$.

The positive electrode active material particles 13 may be, for example, a material whose electrode potential based on an alkaline earth metal becomes higher than +4 V. In this case, the secondary battery 100 can achieve a capacity higher than 4 V while preventing the oxidative decomposition of the liquid electrolyte 30, as described below. Examples of such a material when the secondary battery 100 is a magnesium secondary battery include $MgNiSiO_4$ and $MgCoSiO_4$.

The positive electrode active material layer 12 may optionally include a conductive material and/or a binding material, in addition to the above-mentioned materials.

Examples of the conductive material include carbon material, metals, and electroconductive polymers. Examples of the carbon material include graphites, such as natural graphites (e.g., lump graphite and flaky graphite) and artificial graphites; acetylene black; carbon black; Ketchen black; carbon whisker; needle coke; and carbon fibers. Examples of the metal include copper, nickel, aluminum, silver, and gold. These material may be used alone or as a mixture of two or more.

Examples of the binding material include fluorine-containing resins, such as polytetrafluoroethylene (PTFE), polyvinylidene fluoride (PVDF), and fluororubber; thermoplastic resins, such as polypropylene and polyethylene; ethylene propylene diene monomer (EPDM) rubber; sulfonated EPDM rubber; and natural butyl rubber (NBR). These material may be used alone or as a mixture of two or more. The binding material may be, for example, a water dispersion of a cellulose system or styrene-butadiene rubber (SBR).

Examples of the solvent for dispersing the positive electrode active material particles 13, the conductive material, or the binding material include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The solvent may be, for example, a dispersant containing a thickener. Examples of the thickener include carboxymethyl cellulose and methyl cellulose.

The positive electrode 10 is formed, for example, as follows. First, positive electrode active material particles 13, a conductive material, and a binding material are mixed. Subsequently, an appropriate solvent is added to this mixture to prepare a positive electrode mixture in a paste form. Subsequently, this positive electrode mixture is applied to the surface of a positive electrode collector 11, followed by drying. As a result, a positive electrode 10 is prepared. The dried positive electrode mixture may be compressed together with the positive electrode collector 11 for increasing the electrode density.

The positive electrode 10 may be in a thin-film form. The positive electrode 10 may have a thickness of, for example, 500 nm or more and 20 µm or less.

[3. Negative Electrode]

The negative electrode 20 includes a negative electrode collector 21 and a negative electrode active material layer 22. The negative electrode active material layer 22 is disposed on the negative electrode collector 21 and includes a plurality of negative electrode active material particles 23. In other words, the negative electrode active material particles 23 are disposed on the negative electrode collector 21. The lower surface of the negative electrode active material layer 22 is an irregular surface defined by the negative electrode active material particles 23.

The negative electrode collector 21 is, for example, a metal sheet or a metal film. The negative electrode collector 21 may be porous or non-porous. Examples of the metal material include aluminum, aluminum alloys, stainless steel, titanium, and titanium alloys. A carbon material, such as carbon, may be applied to the surface of the negative electrode collector 21.

Examples of the negative electrode active material particles 23 include metals, carbon materials, metal oxides, carbon intercalation compounds, and sulfides. The negative electrode active material particles 23 contain, for example, an alkaline earth metal or an alkaline earth metal-containing alloy. Alternatively, the negative electrode active material particles 23 may be a material that can occlude and release alkaline earth metal ions.

When the secondary battery 100 is a magnesium secondary battery, examples of the material of the negative electrode active material particles 23 include magnesium, tin, bismuth, antimony, and magnesium alloys. The magnesium alloy contains, for example, magnesium and at least one selected from tin, bismuth, titanium, manganese, lead, antimony, aluminum, silicon, gallium, and zinc.

When the secondary battery 100 is a calcium secondary battery, examples of the material of the negative electrode active material particles 23 include calcium and calcium alloys.

The negative electrode active material layer 22 may optionally include a conductive material and/or a binding material, in addition to the above-mentioned materials. As the conductive material, the binding material, the solvent, and the thickener in the negative electrode active material layer 22, the materials described in the positive electrode active material layer 12 can be appropriately used.

The negative electrode 20 can be formed by the same method as the method of forming the positive electrode 10.

The negative electrode 20 may be in a thin film form. The negative electrode 20 may have a thickness of, for example, 500 nm or more and 20 µm or less.

[4. Solid Electrolyte Layer]

The solid electrolyte layer 40 is disposed on the positive electrode active material layer 12 and covers the positive electrode active material particles 13. The solid electrolyte layer 40 is formed along the irregular surface defined by the positive electrode active material particles 13.

The solid electrolyte layer 40 contains an alkaline earth metal and can move alkaline earth metal ions according to the electric field. At the same time, the solid electrolyte layer 40 blocks electrons from moving between the positive electrode active material particles 13 and the liquid electrolyte 30.

The solid electrolyte layer 40 is made of an inorganic solid electrolyte and may contain a polyanion composed of at least one of oxygen and nitrogen and at least one of phosphorus and silicon, in addition to the alkaline earth metal.

When the secondary battery 100 is a magnesium secondary battery, examples of the material of the solid electrolyte layer 40 include magnesium phosphorus oxynitride, $Mg_xSiO_yN_z$ (where, $1<x<2$, $3<y<5$, $0 \le z<1$), $Mg_xM_ySiO_z$ (where, M is at least one selected from the group consisting of Ti, Zr, Hf, Ca, Sr, and Ba; and $0<x<2$, $0<y<2$, $3<z<6$), $Mg_{2-1.5x}Al_xSiO_4$ (where, $0.1 \le x \le 1$), $Mg_{2-1.5x-0.5y}Al_{x-y}Zn_ySiO_4$ (where, $0.5 \le x \le 1$, $0.5 \le y \le 0.9$, $x-y \ge 0$, $x+y \le 1$), $MgZr_4(PO_4)_6$, $MgMPO_4$ (where, M is at least one selected from Zr, Nb, and Hf), $Mg_{1-x}A_xM(M'O_4)_3$ (where, A is at least one selected from Ca, Sr, Ba, and Ra; M is at least one selected from Ze and Hf; M' is at least one selected from W and Mo; and $0 \le x<1$), and $Mg(BH_4)(NH_2)$.

The solid electrolyte layer 40 may contain, for example, magnesium phosphorus oxynitride or $Mg_xM_ySiO_z$ (where, M is at least one selected from the group consisting of Ti, Zr, Hf, Ca, Sr, and Ba; and $0<x<2$, $0<y<2$, $3<z<6$). These materials exhibit relatively high conductivity and can therefore suppress the decomposition of the liquid electrolyte 30 without rate-limiting the charging and discharging reaction. In order to further enhance the conductivity, the solid electrolyte layer 40 may contain, for example, magnesium phosphorus oxynitride or $Mg_xCa_ySiO_z$ ($0<x<2$, $0<y<2$, $3<z<6$). Alternatively, from the viewpoint of low activation energy, the solid electrolyte layer 40 may contain, for example, $Mg_xM_ySiO_z$ (where, M is Zr or Ca; and $0<x<2$, $0<y<2$, $3<z<6$).

Furthermore, for detailed description of each material, U.S. patent application Ser. Nos. 15/371,063, 15/658,313, and 15/658,320 are incorporated herein by reference.

When the secondary battery 100 is another alkaline earth metal secondary battery, examples of the material of the solid electrolyte layer 40 include $AM(M'O_4)_3$ (where, A is at least one selected from Ca, Sr, Ba, and Ra; M is at least one selected from Ze and Hf; and M' is at least one selected from W and Mo).

The solid electrolyte layer 40 can be formed by, for example, a physical deposition method or a chemical deposition method. Examples of the physical deposition method include sputtering, vacuum evaporation, ion plating, and pulsed-laser deposition (PLD). Examples of the chemical deposition method include atomic layer deposition (ALD), chemical vapor deposition (CVD), liquid phase deposition, a sol-gel method, metallo-organic decomposition (MOD), spray pyrolysis deposition (SPD), a doctor blade method, spin coating, and a printing technique. Examples of CVD include plasma CVD, thermal CVD, and laser CVD. The liquid phase deposition is, for example, wet plating, and examples of the wet plating include electric plating, immersion plating, and electroless plating. Examples of the printing technique include an ink jet method and screen printing.

The solid electrolyte layer 40 can be formed, for example, without annealing. Therefore, the production process can be simplified, the production cost can be reduced, and the yield can be increased.

The solid electrolyte layer 40 may be crystalline or may be amorphous. The solid electrolyte layer 40 may have a thickness of, for example, 200 nm or less. When the solid electrolyte layer 40 is an amorphous ultrathin film, the thickness may be, for example, 1 nm or more and 3 nm or less. In addition, when the solid electrolyte layer 40 is amorphous, the solid electrolyte layer 40 can be readily formed along the irregular surface of the positive electrode active material layer 12.

[5. Liquid Electrolyte]

The liquid electrolyte 30 fills the space between the positive electrode 10 and the negative electrode 20. The liquid electrolyte 30 may further fill the gap among the positive electrode active material particles 13 and/or the gap among the negative electrode active material particles 23.

The liquid electrolyte 30 is a solution where an alkaline earth metal salt is dissolved in a non-aqueous solvent and can move alkaline earth metal ions according to the electric field.

Examples of the material of the non-aqueous solvent include cyclic ethers chain ethers, cyclic carbonates, chain carbonates, cyclic carboxylates, chain carboxylates, pyrocarbonates, phosphates, borates, sulfates, sulfites, cyclic sulfones, chain sulfones, nitriles, and sulfones.

Examples of the cyclic ether include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ether; and derivatives thereof. Examples of the chain ether include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether; and derivatives thereof.

Examples of the cyclic carbonate include ethylene carbonate, propylene carbonate, butylene carbonate, vinylene carbonate, fluoroethylene carbonate, 4,5-difluoroethylene carbonate, 4,4,4-trifluoroethylene carbonate, fluoromethyl ethylene carobnate, trifluoromethyl ethylene carbonate, 4-fluoropropylene carbonate, and 5-fluoropropylene carbonate; and derivatives thereof. Examples of the chain carbonate include dimethyl carbonate, ethyl methyl carbonate, diethyl carbonate, methyl propyl carbonate, ethyl propyl carbonate, and methyl isopropyl carbonate; and derivatives thereof.

Examples of the cyclic carboxylate include γ-butyrolactone, γ-valerolactone, γ-caprolactone, ε-caprolactone, and α-acetolactone; and derivatives thereof. Examples of the chain carboxylate include methyl acetate, ethyl acetate, propyl acetate, butyl acetate, methyl propionate, ethyl propionate, propyl propionate, and butyl propionate; and derivatives thereof.

Examples of the pyrocarbonate include diethyl pyrocarbonate, dimethyl pyrocarbonate, and di-tert-butyl dicarbonate; and derivatives thereof. Examples of the phosphate include trimethyl phosphate, triethyl phosphate, and hexamethylphosphoramide; and derivatives thereof. Examples of the borate include trimethyl borate and triethyl borate; and derivatives thereof. Examples of the sulfate include trimethyl sulfate and triethyl sulfate; and derivatives thereof. Examples of the sulfite include ethylene sulfite and derivatives thereof.

Examples of the cyclic sulfone include sulfolane and derivatives thereof. Examples of the chain sulfone include alkyl sulfone and derivatives thereof. Examples of the nitrile include acetonitrile, valeronitrile, propionitrile, trimethylacetonitrile, cyclopentanecarbonitrile, adiponitrile, and pimelonitrile; and derivatives thereof. Examples of the sultone include 1,3-propane sultone and derivatives thereof.

As the solvent, the above-mentioned substances may be used alone or in combination of two or more thereof.

When the secondary battery 100 is a magnesium secondary battery, examples of the magnesium salt include $MgBr_2$, $MgI_2$, $MgCl2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, and $Mg[PF_3(CF_2CF_3)_3]_2$. As the magnesium salt, these substances may be used alone or in combination of two or more thereof.

When the secondary battery 100 is a calcium secondary battery, examples of the calcium salt include calcium perchlorate.

The liquid electrolyte 30 fills, for example, the space between the positive electrode 10 and the negative electrode 20 facing each other inside an outer packaging (not shown) and is impregnated in the positive electrode 10, the solid electrolyte layer 40, and the negative electrode 20.

[6. Effects]

In known secondary batteries not having solid electrolyte layers, as described above, electrons are transferred at the contact surfaces of the positive electrode and the liquid electrolyte, leading to a risk of decomposition of the liquid electrolyte. In contrast, the secondary battery 100 includes a solid electrolyte layer 40 covering the positive electrode 10 and can therefore prevent electrons from moving between the positive electrode 10 and the liquid electrolyte 30, while allowing alkaline earth metal ions to move between the positive electrode 10 and the liquid electrolyte 30. Accordingly, the liquid electrolyte 30 can be prevented from decomposing while the electrical characteristics of the secondary battery 100 being maintained. As a result, the secondary battery 100 can be stabilized and can have a long lifetime.

The solid electrolyte layer 40 need not completely prevent the positive electrode 10 and the liquid electrolyte 30 from being in contact with each other. For example, the solid electrolyte layer 40 can decrease, at minimum, the contact area of the positive electrode 10 with the liquid electrolyte 30 compared to that in a structure not having a solid electrolyte layer 40.

In particular, when the charging potential of the positive electrode 10 is higher than 4 V in charging of the secondary battery 100, the function of preventing the decomposition of the liquid electrolyte 30 more significantly acts. For example, in the secondary battery 100, a designer can use materials that have been recognized to be unusable for liquid electrolytes in a region where the charging potential exceeds 4 V. For example, a designer can use a non-aqueous solvent that has been used in known lithium ion secondary batteries as a non-aqueous solvent of a high-capacity alkaline earth metal secondary battery. Accordingly, the degree of freedom in selection of the material of the secondary battery 100 is increased.

In the secondary battery 100, the liquid electrolyte 30 and the solid electrolyte layer 40 can function as electrolytes. A designer can make the liquid electrolyte 30 function as a main component of the electrolyte by, for example, regulating the distance between the negative electrode 20 and the solid electrolyte layer 40 and the thickness of the solid electrolyte layer 49. Consequently, a secondary battery including an electrolyte having excellent electrical characteristics can be achieved, compared to, for example, a secondary battery in which the electrolyte is all solid (i.e., all-solid secondary battery).

In a secondary battery 100, the solid electrolyte layer 40 covers the positive electrode active material layer 12 such that the positive electrode active material particles 13 are collectively covered. Accordingly, the solid electrolyte layer 40 is easily produced compared to, for example, solid electrolyte coat 40c described below. Furthermore, for example, when the positive electrode active material layer 12 contains a conductive material, the solid electrolyte layer 40 can also cover the conductive material, in addition to the positive electrode active material particles 13. Accordingly, the solid electrolyte layer 40 can also suppress the reaction between the conductive material and the liquid electrolyte 30.

When the secondary battery 100 is a magnesium secondary battery, novel effects as shown below can be further obtained.

If the positive electrode and the liquid electrolyte become in contact with each other in a magnesium secondary battery, a magnesium compound (e.g., magnesium oxide) may precipitate at their contact surfaces. This precipitate is a passive film and inhibits magnesium ions from moving between the positive electrode and the liquid electrolyte. Accordingly, the magnesium secondary battery has a risk of being prevented by the precipitated passive film from charge and discharge operation.

Lithium ion secondary batteries are also known to precipitate a lithium compound. However, this precipitate is ion-conductive and does not inhibit the movement of lithium ions. Accordingly, the problem due to a passive film does not occur in lithium ion secondary batteries and is a problem specific to magnesium secondary batteries.

Accordingly, when the secondary battery 100 is a magnesium secondary battery, the solid electrolyte layer 40 covers the positive electrode 10 to suppress the occurrence of a passive film on the positive electrode 10. Consequently, stable charge and discharge operation of the secondary battery 100 can be achieved.

[7. Various Modifications]
[7-1. Modification 1]

Figure 2:
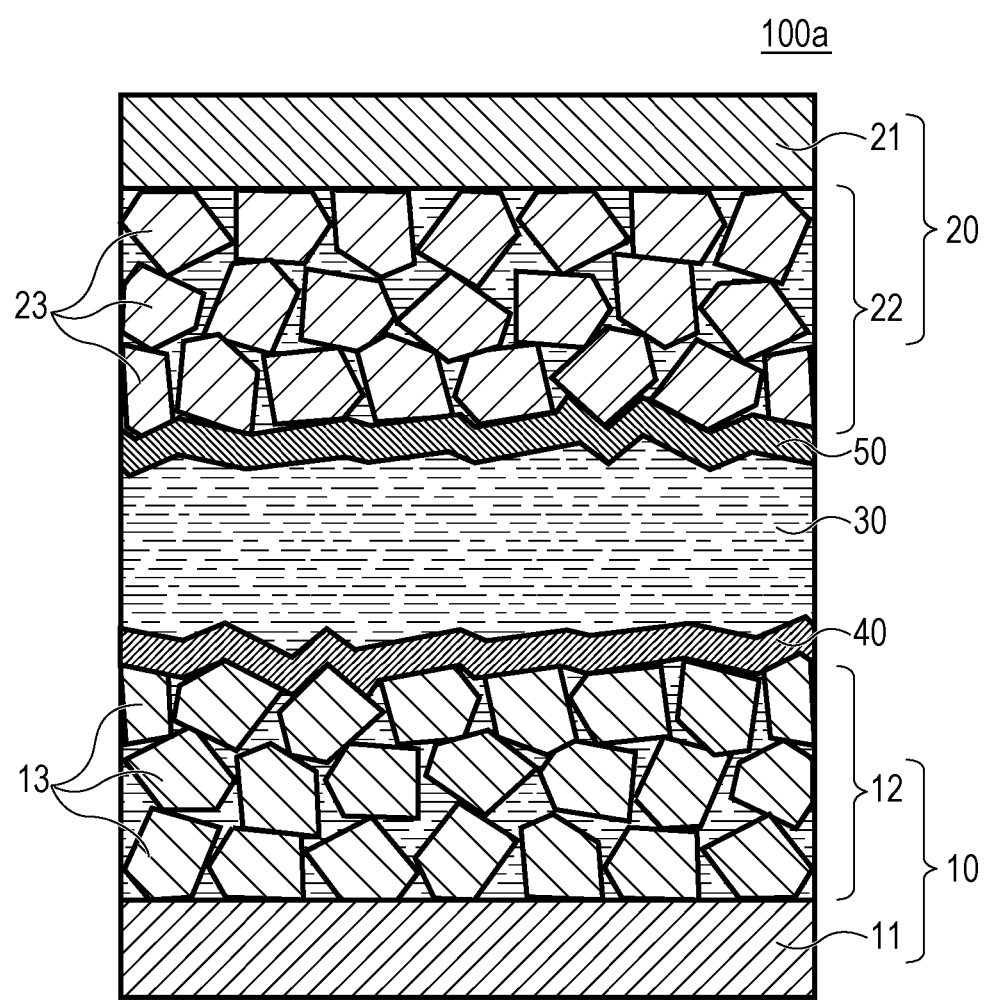
FIG. 2 is a schematic cross-sectional view illustrating the structure of Modification 1 of the secondary battery according to First Embodiment.

FIG. 2 is a schematic cross-sectional view illustrating the structure of a secondary battery 100a as Modification 1 of the secondary battery according to First Embodiment.

The secondary battery 100a includes a positive electrode 10, a negative electrode 20, a liquid electrolyte 30, a solid electrolyte layer 40, and a solid electrolyte layer 50. The solid electrolyte layer 50 covers the negative electrode 20. Except for the solid electrolyte layer 50, the structure of each component of the secondary battery 100a is the same as that of the corresponding component of the secondary battery 100, and the explanations thereof are omitted.

The solid electrolyte layer 50 is disposed on the negative electrode active material layer 22 and covers a plurality of negative electrode active material particles 23. The solid electrolyte layer 50 is formed along an irregular surface defined by the negative electrode active material particles 23.

The material of the solid electrolyte layer 50 can be selected from various materials, for example, those mentioned in the above section [4. Solid electrolyte layer]. The method of forming the solid electrolyte layer 50 can be selected from various methods, for example, those mentioned in the above section [4. Solid electrolyte layer].

The solid electrolyte layer 50 may be crystalline or may be amorphous. The solid electrolyte layer 50 may have a thickness of, for example, 20 μm or less. The thickness of the solid electrolyte layer 50 further may be, for example, 5 nm or more and 200 nm or less. When the solid electrolyte layer 50 is an amorphous ultrathin film, the thickness may be, for example, 1 nm or more and 3 nm or less. In addition, when the solid electrolyte layer 50 is amorphous, the solid electrolyte layer 50 can be readily formed along the irregular surface of the negative electrode active material layer 22.

The secondary battery 100a has an effect caused by the solid electrolyte layer 50, in addition to the various effects described in the above section [6. Effects]. The effect caused by the solid electrolyte layer 50 can be comprehended by appropriately replacing the "solid electrolyte layer 40" and the "positive electrode 10" in the description of the above section [6. Effects] by "solid electrolyte layer 50" and "negative electrode 20", respectively. Briefly, the solid electrolyte layer 50 prevents the contact between the negative electrode 20 and the liquid electrolyte 30 and can thereby prevent the reductive decomposition of the liquid electrolyte 30. When the secondary battery 100a is a magnesium secondary battery, the solid electrolyte layer 50 can suppress the occurrence of a passive film on the negative electrode 20.

[7-2. Modification 2]

Figure 3:
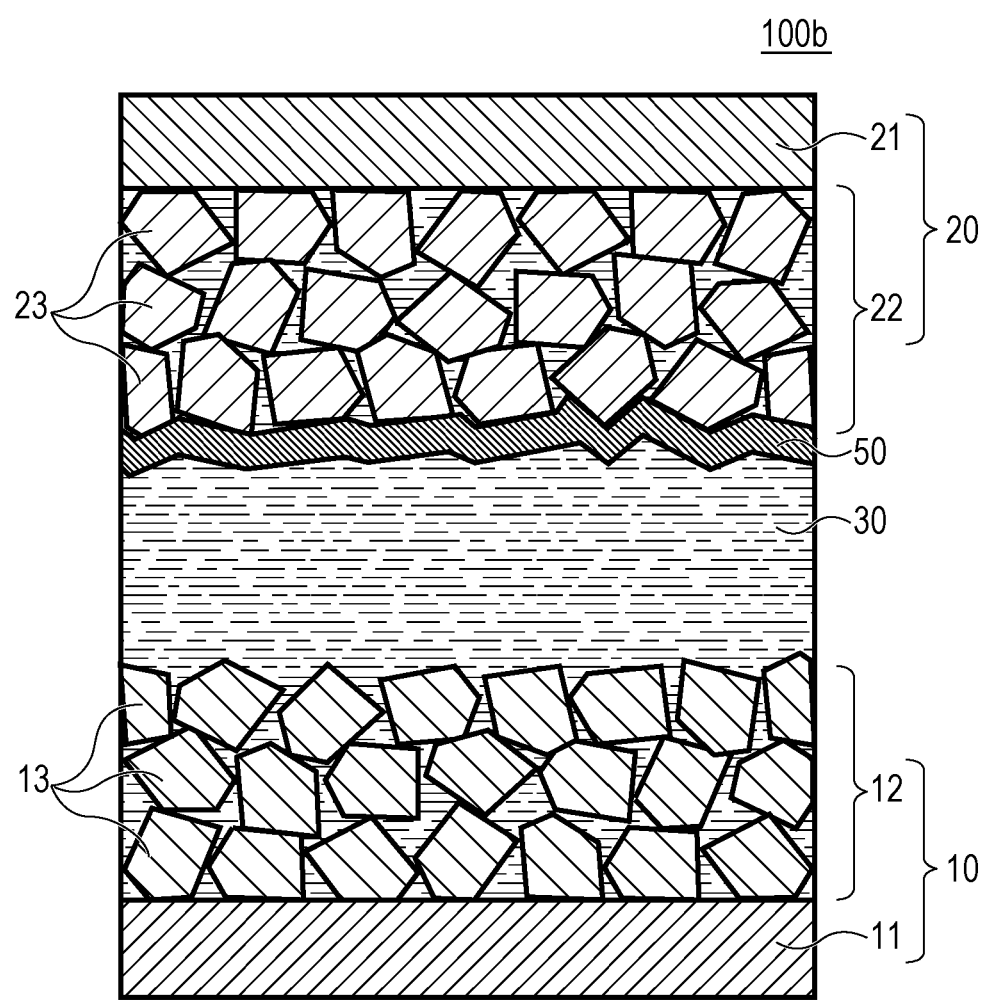
FIG. 3 is a schematic cross-sectional view illustrating the structure of Modification 2 of the secondary battery according to First Embodiment.

FIG. 3 is a schematic cross-sectional view illustrating the structure of a secondary battery 100b as Modification 2 of the secondary battery according to First Embodiment.

The secondary battery 100b includes a positive electrode 10, a negative electrode 20, a liquid electrolyte 30, and a solid electrolyte layer 50. That is, the secondary battery 100b has a structure in which the solid electrolyte layer 40 is removed from the secondary battery 100a. The structure of each component of the secondary battery 100b is the same as that of the corresponding component of the secondary battery 100, and the explanations thereof are omitted.

The secondary battery 100b has the same effect as that caused by the solid electrolyte layer 50 described in the above section [7-1. Modification 1].

[7-3. Modification 3]

Figure 4:
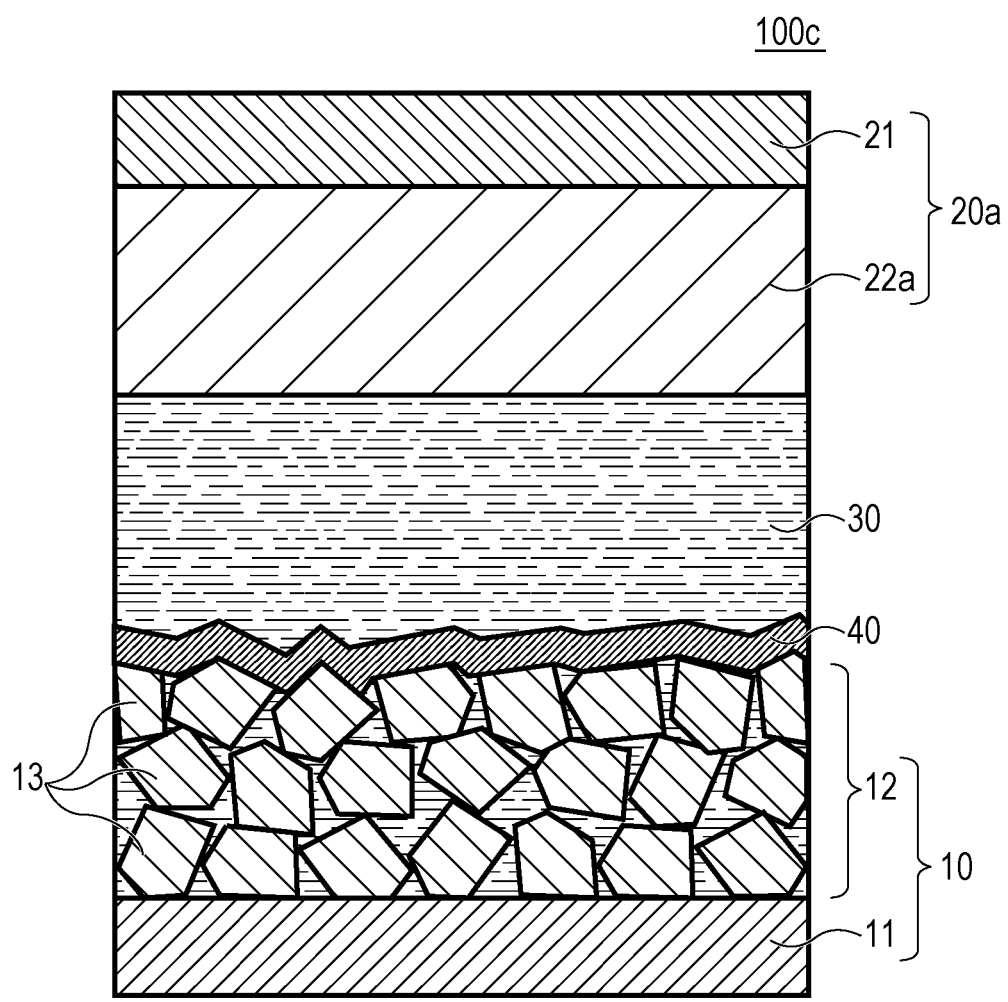
FIG. 4 is a schematic cross-sectional view illustrating the structure of Modification 3 of the secondary battery according to First Embodiment.

FIG. 4 is a schematic cross-sectional view illustrating the structure of a secondary battery 100c as Modification 3 of the secondary battery according to First Embodiment.

The secondary battery 100c includes a positive electrode 10, a negative electrode 20a, a liquid electrolyte 30, and a solid electrolyte layer 40. The negative electrode 20a includes a negative electrode collector 21 and a negative electrode active material layer 22a. Except for the negative electrode active material layer 22a, the structure of each component of the secondary battery 100c is the same as that of the corresponding component of the secondary battery 100, and the explanations thereof are omitted.

The negative electrode active material layer 22a is a tabular layer disposed on the negative electrode collector 21. The material of the negative electrode active material layer 22a can be selected from various materials, for example, those mentioned in the above section [3. Negative electrode]. The negative electrode active material layer 22a can be formed by, for example, a physical deposition method or a chemical deposition method. The negative electrode active material layer 22a may be, for example, a metal layer or an alloy layer.

The secondary battery 100c has the same effects as the various effects described in the above section [6. Effects].

[7-4. Modification 4]

Figure 5:
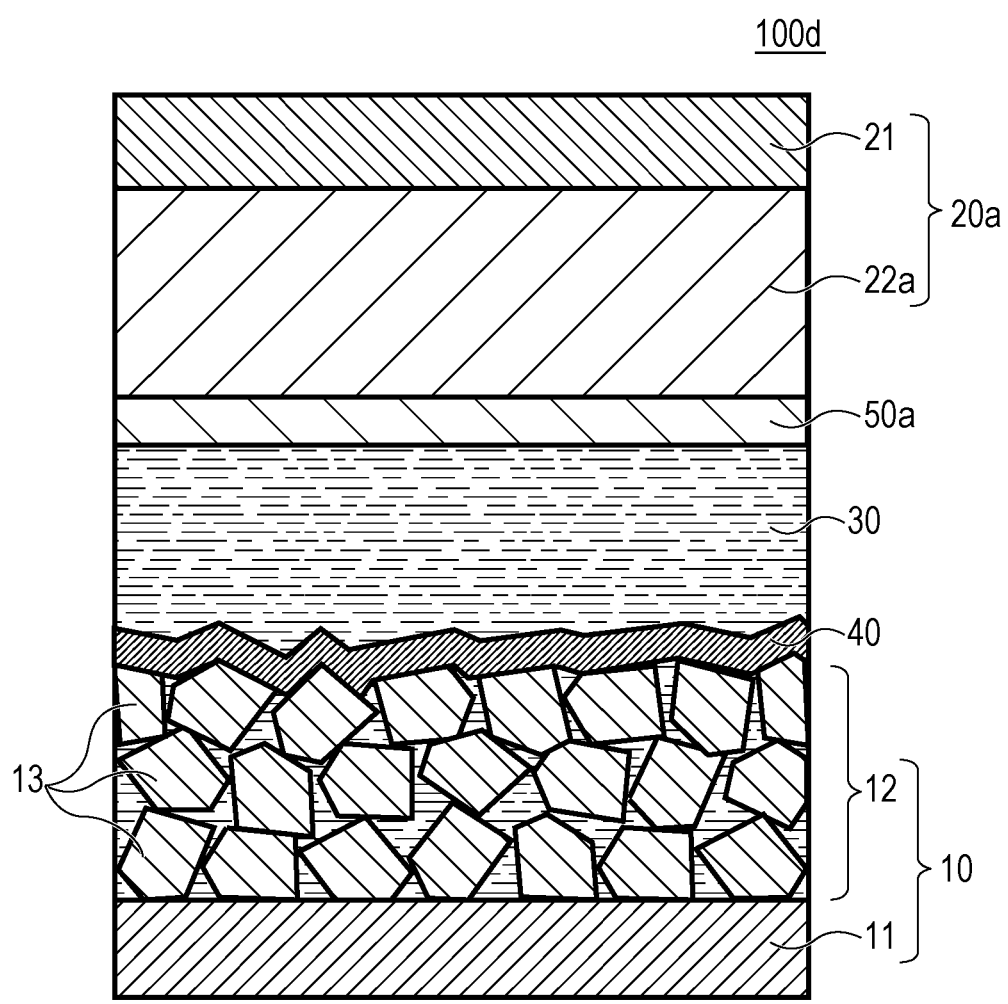
FIG. 5 is a schematic cross-sectional view illustrating the structure of Modification 4 of the secondary battery according to First Embodiment.

FIG. 5 is a schematic cross-sectional view illustrating the structure of a secondary battery 100d as Modification 4 of the secondary battery according to First Embodiment.

The secondary battery 100d includes a positive electrode 10, a negative electrode 20a, a liquid electrolyte 30, a solid electrolyte layer 40, and a solid electrolyte layer 50a. Except for the solid electrolyte layer 50a, the structure of each component of the secondary battery 100d is the same as that of the corresponding component of the secondary battery 100c, and the explanations thereof are omitted.

The solid electrolyte layer 50a is a tabular layer disposed on the negative electrode active material layer 22a. The material of the solid electrolyte layer 50a and the method of forming the layer are as in those described in the above section [4. Solid Electrolyte Layer].

The secondary battery 100d has the same effects as the various effects described in the above section [7-1. Modification 1].

[7-5. Modification 5]

Figure 6:
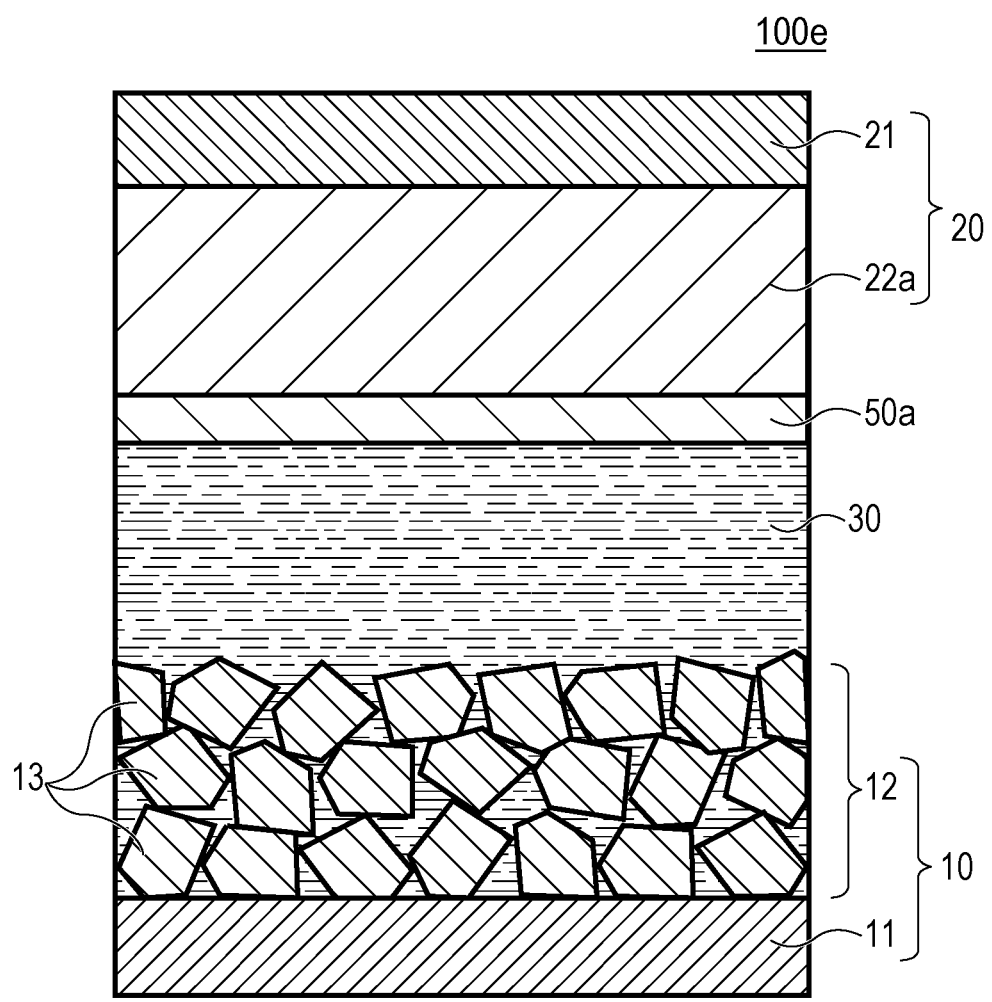
FIG. 6 is a schematic cross-sectional view illustrating the structure of Modification 5 of the secondary battery according to First Embodiment.

FIG. 6 is a schematic cross-sectional view illustrating the structure of a secondary battery 100e as Modification 5 of the secondary battery according to First Embodiment.

The secondary battery 100e includes a positive electrode 10, a negative electrode 20a, a liquid electrolyte 30, and a solid electrolyte layer 50a. That is, the secondary battery 100e has a structure in which the solid electrolyte layer 40 is removed from the secondary battery 100d. The structure of each component of the secondary battery 100e is the same as that of the corresponding component of the secondary battery 100d, and the explanations thereof are omitted.

The secondary battery 100e has the same effect as that caused by the solid electrolyte layer 50 described in the above section [7-1. Modification 1].

[8. Experiments]

It was confirmed by experiments described below that electrodes each having a surface provided with a solid electrolyte can suppress the decomposition of a liquid electrolyte.

[8-1. Production of Samples]

[8-1-1. Sample 1]

As Sample 1, a cell including a working electrode having a surface provided with a solid electrolyte film, a counter electrode, and a reference electrode was prepared.

The working electrode and the solid electrolyte film were produced as follows. First, a $V_2O_5$ film having a thickness of 200 nm was formed on a $Pt/Ti/SiO_2$ substrate by pulsed-laser deposition (PLD). The film forming conditions were a substrate temperature of 350° C., a laser intensity of 100 mJ, a repetition frequency of 20 Hz, and an oxygen partial pressure of 18 Pa. Subsequently, a solid electrolyte film having a thickness of 2.5 nm was formed on the $V_2O_5$ film by radio frequency magnetron sputtering using $Mg_2SiO_4$ and $ZrSiO_4$ targets. The substrate temperature was room temperature. The sputtering gas was an argon-oxygen gas mixture of 95% argon and 5% oxygen. The gas pressure was 0.67 Pa. The sputtering powers of $Mg_2SiO_4$ and $ZrSiO_4$ were 50 W (RF) and 200 W (RF), respectively. The composition of the resulting solid electrolyte was $Mg_{0.67}Zr_{1.25}SiO_{5.22}$.

The counter electrode used was Mg foil (manufactured by The Nilaco Corporation) having a thickness of 0.25 mm, a width of 3 mm, and a length of 30 mm.

The reference electrode used was an Ag/AgCl double junction reference electrode (manufactured by EC Frontier Co., Ltd., Model No. RE-10A). As the internal solution of the reference electrode, a liquid electrolyte (manufactured by Kishida Chemical Co., Ltd.) where 0.01 mol/L silver bis(trifluoromethanesulfonyl)imide (Ag(TFSI)) was dissolved in acetonitrile was used.

A microanalysis cell (manufactured by E C Frontier Co., Ltd., Model No. VB7) was used as the cell. The cell was filled with a liquid electrolyte (manufactured by Kishida Chemical Co., Ltd.) where 0.5 mol/L magnesium bis(trifluoromethanesulfonyl)imide $(Mg(TFSI)_2)$ was dissolved in triethylene glycol dimethyl ether.

[8-1-2. Sample 2]

Sample 2 differed from Sample 1 only in that the thickness of the solid electrolyte film was 1 nm.

[8-1-3. Sample 3]

Sample 3 differed from Sample 1 only in that the solid electrolyte film was not formed.

[8-1-4. Sample 4]

Sample 4 differed from Sample 1 only in that the $V_2O_5$ film and the solid electrolyte film were not formed.

[8-2. CV Measurement]

Samples 1 to 4 were disposed in a glove box having a dew point of less than −80° C. and an oxygen concentration of less than 1 ppm and were subjected to cyclic voltammetry (CV) measurement with an electrochemical analyzer (manufactured by BAS Inc., Model No. ALS660E) at a potential scanning rate of 0.1 mV/sec.

Figure 10:
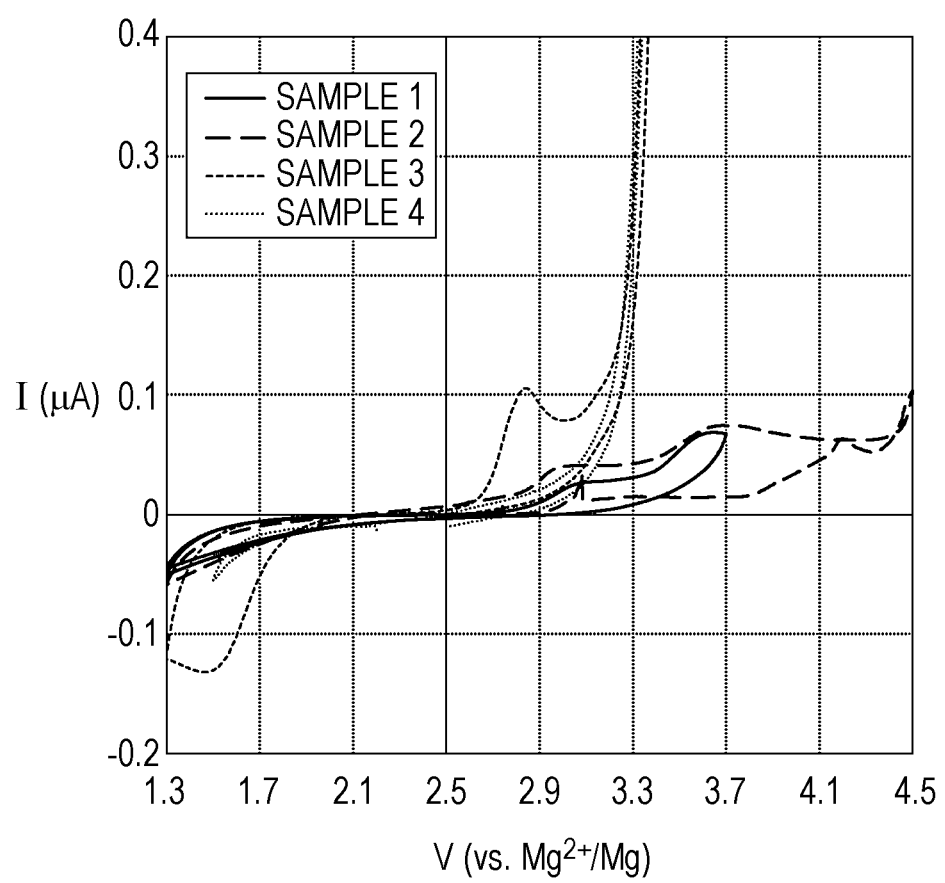
FIG. 10 is a graph showing potential-current curves obtained by CV measurement of Samples 1 to 4.

FIG. 10 shows the results of CV measurement of Samples 1 to 4. The horizontal axis indicates the potential of the working electrode relative to the reference electrode; and the vertical axis indicates the current flew in the working electrode. As shown in FIG. 10, the liquid electrolytes of Samples 1 and 2 were not oxidatively decomposed even at near 3.7 V, whereas the liquid electrolytes of Samples 3 and 4 were oxidatively decomposed at near 3.3 V. This demonstrates that in Samples 1 and 2, the solid electrolyte provided to the working electrode suppressed the oxidative decomposition of the liquid electrolyte. Furthermore, in Sample 1, even if the potential exceeded 4.0 V, the liquid electrolyte was not oxidatively decomposed.

In FIG. 10, the graphs of Samples 1 and 2 respectively show anode current peaks at about 3.0 V and 3.1 V, whereas the graph of Sample 3 shows an anode current peak at about 2.8 V. It is conceived from these results that the shift amount of the peak is caused by the resistance of the solid electrolyte film.

Accordingly, in order to reduce the shift amount of the anode current peak, the secondary battery according to this Embodiment may be designed such that the solid electrolyte film has a reduced thickness and/or that the solid electrolyte film has high conductivity. For example, the solid electrolyte may be designed so as to have a thickness of 10 nm or less, furthermore, 3 nm or less. Alternatively, for example, the material of the solid electrolyte may be selected from materials having relatively high conductivity. Consequently, the decomposition of the liquid electrolyte can be suppressed without rate-limiting the electrode reaction.

Second Embodiment

[1. Structure of Secondary Battery]

Figure 7:
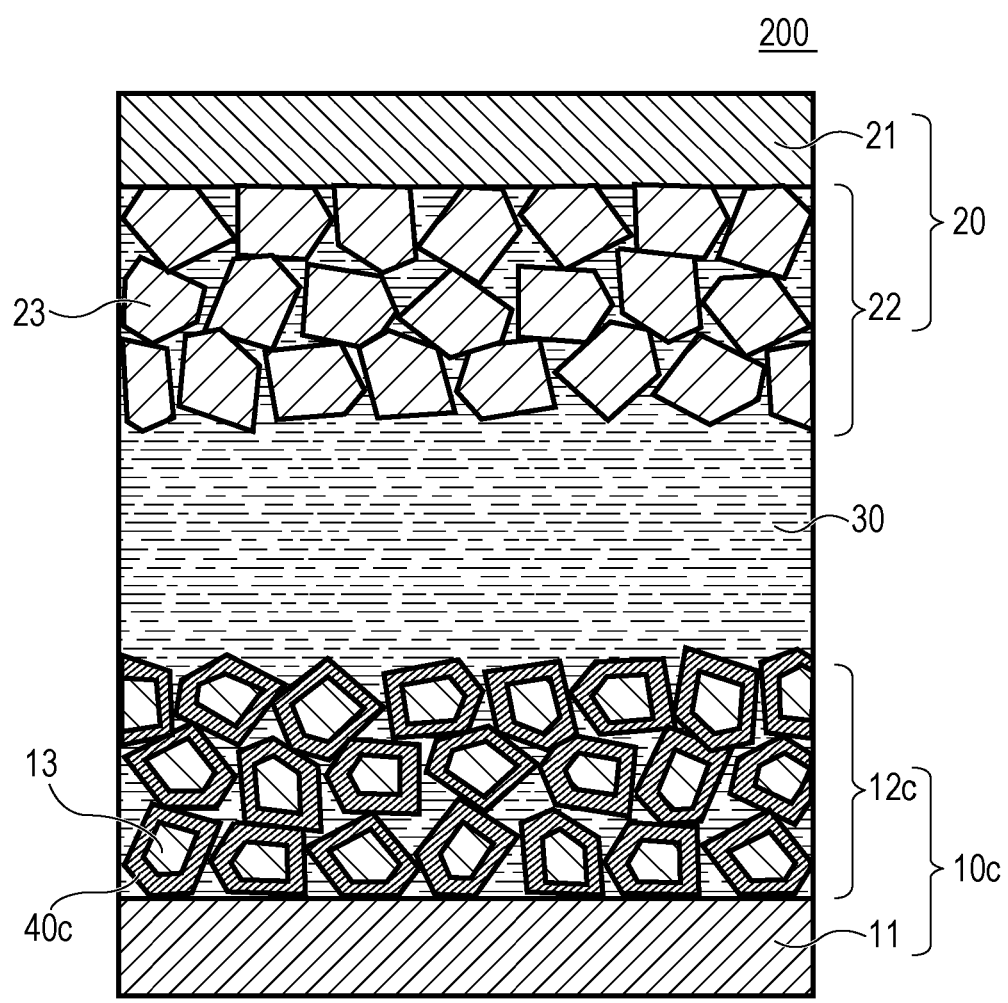
FIG. 7 is a schematic cross-sectional view illustrating a structural example of a secondary battery according to Second Embodiment.

FIG. 7 is a schematic cross-sectional view illustrating a structure of a secondary battery 200 according to Second Embodiment.

The secondary battery 200 has the same structure as that of the secondary battery 100 described in First Embodiment except for the positive electrode 10c and the solid electrolyte coat 40c.

The positive electrode 10c includes a positive electrode collector 11 and a positive electrode active material layer 12c. The positive electrode active material layer 12c is disposed on the positive electrode collector 11 and includes a plurality of positive electrode active material particles 13. The surface of each of the positive electrode active material particles 13 is coated with a solid electrolyte coat 40c. In other words, the positive electrode 10c is coated with a solid electrolyte composed of a plurality of solid electrolyte coats 40c.

[2. Positive Electrode and Solid Electrolyte Coat]

The secondary battery 200 is the same as that described in First Embodiment, except for the shape of the solid electrolyte and the methods for forming the solid electrolyte and the positive electrode, and the explanations thereof are omitted. Specifically, the material of the solid electrolyte coat 40c can be selected from various materials, for example, those mentioned in the section [4. Solid electrolyte layer] of First Embodiment.

The solid electrolyte coat 40c may be crystalline or may be amorphous. In the latter case, the solid electrolyte coat 40c can be readily formed along the shape of the positive electrode active material particles 13 to improve the coatability. The solid electrolyte coat 40c may have a thickness of, for example, 1 nm or more and 200 nm or less.

The positive electrode 10c and the solid electrolyte coat 40c are formed, for example, as follows.

First, a solid electrolyte coat 40c is formed by coating the surface of each of the positive electrode active material particles 13 with a solid electrolyte. The positive electrode active material particles 13 coated with the solid electrolyte are then mixed with a conductive material and a binding material. Subsequently, an appropriate solvent is added to this mixture to prepare a positive electrode mixture in a paste form. Subsequently, this positive electrode mixture is applied to the surface of a positive electrode collector 11, followed by drying. Consequently, a positive electrode 10c is given.

The solid electrolyte coat 40c may be formed by, for example, depositing a solid electrolyte material by the physical deposition method or the chemical deposition method, while moving the positive electrode active material particles 13. Alternatively, the solid electrolyte coat 40c may be formed by, for example, a sol-gel method or the liquid phase deposition described above.

[3. Effects]

The secondary battery 200 has the same effects as the various effects described in First Embodiment. Specifically, the effects can be comprehended by appropriately replacing the "solid electrolyte layer 40" in the description of the section [6. Effects] of First Embodiment by "solid electrolyte coat 40c".

In the secondary battery 200, each of the positive electrode active material particles 13 is coated with the solid electrolyte coat 40c. Accordingly, the surfaces of the positive electrode active material particles 13 are not or hardly exposed to the gaps among the positive electrode active material particles 13. Therefore, for example, even if these gaps are filled with the liquid electrolyte 30, oxidative decomposition of the liquid electrolyte 30 can be more effectively prevented, and/or occurrence of a passive film on the positive electrode 10c can be effectively suppressed.

[4. Various Modifications]

[4-1. Modification 1]

Figure 8:
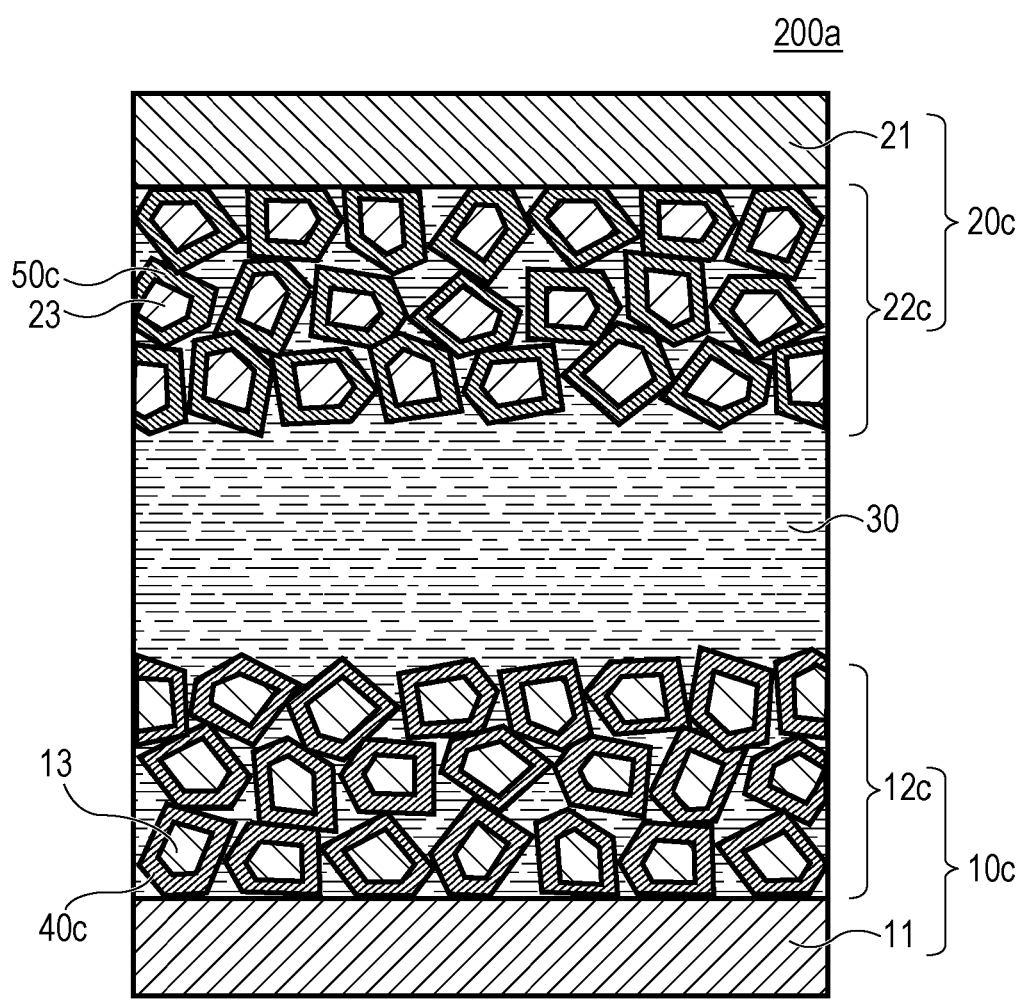
FIG. 8 is a schematic cross-sectional view illustrating the structure of Modification 1 of the secondary battery according to Second Embodiment.

FIG. 8 is a schematic cross-sectional view illustrating the structure of a secondary battery 200a as Modification 1 of the secondary battery according to Second Embodiment.

The secondary battery 200a has the same structure as that of the secondary battery 200 except for the negative electrode 20c and the solid electrolyte coat 50c.

The negative electrode 20c includes a negative electrode collector 21 and a negative electrode active material layer 22c. The negative electrode active material layer 22c is disposed on the negative electrode collector 21 and includes a plurality of negative electrode active material particles 23. The surface of each of the negative electrode active material particles 23 is coated with the solid electrolyte coat 50c. In other words, the negative electrode 20c is coated with a solid electrolyte composed of a plurality of solid electrolyte coats 50c.

The material of the solid electrolyte coat 50c is selected from various materials, for example, those mentioned in the section [4. Solid electrolyte layer] of First Embodiment. The solid electrolyte coat 50c may be crystalline or may be amorphous. In the latter case, the solid electrolyte coat 50c can be readily formed along the shape of the negative electrode active material particles 23 to improve the coatability. The solid electrolyte coat 50c may have a thickness of, for example, 1 nm or more and 200 nm or less.

The methods of forming the negative electrode 20c and the solid electrolyte coat 50c may be, for example, the same as the methods described in the above section [2. Positive Electrode and Solid Electrolyte Coat].

The secondary battery 200a has an effect caused by the solid electrolyte coat 50c, in addition to the various effects described in the above section [3. Effects]. The effect caused by the solid electrolyte coat 50c can be comprehended by appropriately replacing the "solid electrolyte layer 40" and the "positive electrode 10" in the description of the section [6. Effects] of First Embodiment by "solid electrolyte coat 50c" and "negative electrode 20c", respectively.

In the secondary battery 200a, each of the negative electrode active material particles 23 is coated with the solid electrolyte coat 50c. Accordingly, even if the liquid electrolyte 30 fills the gaps among the negative electrode active material particles 23, reductive decomposition of the liquid electrolyte 30 can be more effectively prevented, and/or occurrence of a passive film on the negative electrode 20c can be effectively suppressed.

[4-2. Modification 2]

Figure 9:
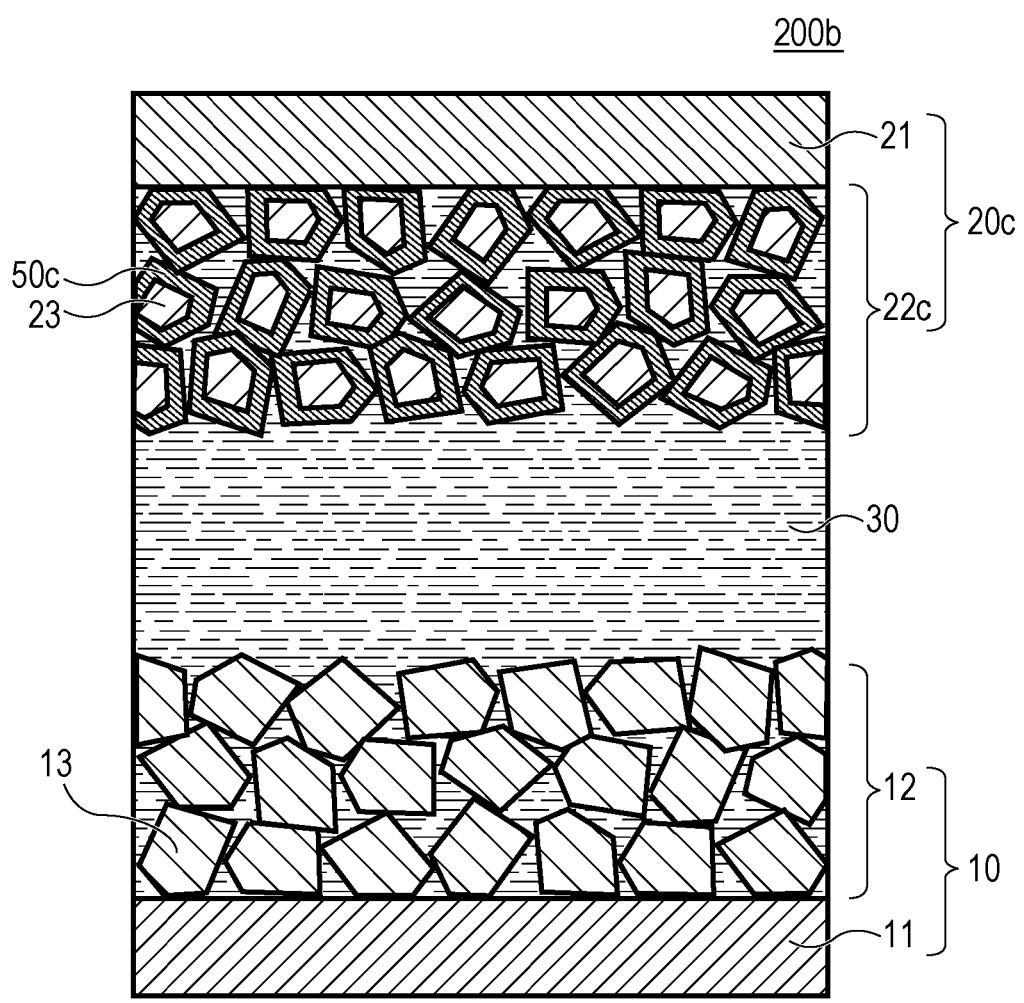
FIG. 9 is a schematic cross-sectional view illustrating the structure of Modification 2 of the secondary battery according to Second Embodiment.

FIG. 9 is a schematic cross-sectional view illustrating the structure of a secondary battery 200b as Modification 2 of the secondary battery according to Second Embodiment.

The secondary battery 200b has a structure in which the solid electrolyte coat 40c is removed from the secondary battery 200a. The structure of each component of the secondary battery 200b is the same as that of the corresponding component of the secondary battery 200a, and the explanations thereof are omitted.

The secondary battery 200b has the same effect as that caused by the solid electrolyte coat 50c described in the above section [4-1. Modification 1].

[4-3. Other Modifications]

The secondary batteries 200, 200a, and 200b described above may be combined with any one of secondary batteries 100, 100a, 100b, 100c, 100d, and 100e described in First Embodiment.

For example, the negative electrode 20 of the secondary battery 200 may be replaced by the negative electrode 20a described in the section [7-3. Modification 3] of First Embodiment and may be further provided with the solid electrolyte layer 50a described in the section [7-4, Modification 4] of First Embodiment.

What is claimed is:

1. A secondary battery comprising:
   a first electrode;
   a second electrode;
   a first solid electrolyte covering the first electrode, the first solid electrolyte containing an alkaline earth metal; and
   a liquid electrolyte filling a space between the first electrode and the second electrode, the liquid electrolyte containing a non-aqueous solvent and a salt of the alkaline earth metal dissolved in the non-aqueous solvent,
   wherein the first solid electrolyte contains a compound represented by $Mg_xZr_ySiO_z$,
   where
   $0<x<2$,
   $0<y<2$,
   and $3<z<6$.

2. The secondary battery according to claim 1, wherein the first solid electrolyte further contains a polyanion composed of:
   at least one selected from the group consisting of oxygen and nitrogen; and
   at least one selected from the group consisting of phosphorus and silicon.

3. The secondary battery according to claim 1, wherein the first solid electrolyte is amorphous.

4. The secondary battery according to claim 1, wherein the first electrode is a positive electrode, and
   the second electrode is a negative electrode.

5. The secondary battery according to claim 4, wherein the positive electrode includes:
   a positive electrode collector; and
   a positive electrode active material layer disposed on the positive electrode collector, the positive electrode active material layer including a plurality of positive electrode active material particles, and
   the first solid electrolyte is formed as a layer disposed on the positive electrode active material layer, the positive electrode active material particles being collectively covered with the layer.

6. The secondary battery according to claim 5, wherein the positive electrode active material layer has an irregular surface defined by the positive electrode active material particles, and
   the first solid electrolyte is formed along the irregular surface.

7. The secondary battery according to claim 4, wherein the positive electrode includes:
   a positive electrode collector; and
   a positive electrode active material layer disposed on the positive electrode collector, the positive electrode active material layer including a plurality of positive electrode active material particles, and
   the first solid electrolyte is formed as a plurality of coats covering the respective positive electrode active material particles.

8. The secondary battery according to claim 4, further comprising:
   a second solid electrolyte covering the negative electrode and containing the alkaline earth metal.

9. The secondary battery according to claim 1, wherein the first electrode is a negative electrode, and
   the second electrode is a positive electrode.

10. The secondary battery according to claim 9, wherein the negative electrode includes:
    a negative electrode collector; and
    a negative electrode active material layer disposed on the negative electrode collector, the negative electrode active material layer including a plurality of negative electrode active material particles, and
    the first solid electrolyte is formed as a layer disposed on the negative electrode active material layer, the negative electrode active material particles being collectively covered with the layer.

11. The secondary electrode according to claim 10, wherein
    the negative electrode active material layer has an irregular surface defined by the negative electrode active material particles; and
    the first solid electrolyte is formed along the irregular surface.

12. The secondary battery according to claim 9, wherein the negative electrode includes:
    a negative electrode collector; and
    a negative electrode active material layer disposed on the negative electrode collector, the negative electrode active material layer including a plurality of negative electrode active material particles, and
    the first solid electrolyte is formed as a plurality of coats covering the respective negative electrode active material particles.

13. The secondary battery according to claim 9, wherein the negative electrode includes:
    a negative electrode collector; and
    a metal layer or an alloy layer disposed on the negative electrode collector.

14. The secondary battery according to claim 13, wherein the metal layer or the alloy layer has a standard electrode potential of more positive than −3 V.

15. The secondary battery according to claim 4, wherein the positive electrode has an electrode potential of +4 V or more based on the alkaline earth metal.

16. The secondary battery according to claim 1, wherein the first solid electrolyte is configured to block electrons from moving between the first electrode and the liquid electrolyte but allow alkaline earth metal ions to move between the first electrode and the liquid electrolyte.

* * * * *